US008504360B2

(12) United States Patent
Pedersen

(10) Patent No.: US 8,504,360 B2
(45) Date of Patent: Aug. 6, 2013

(54) AUTOMATIC SOUND RECOGNITION BASED ON BINARY TIME FREQUENCY UNITS

(75) Inventor: Michael Syskind Pedersen, Smørum (DK)

(73) Assignee: Oticon A/S, Smorum (DK)

( * ) Notice: Subject to any disclaimer, the term of this patent is extended or adjusted under 35 U.S.C. 154(b) by 222 days.

(21) Appl. No.: 12/850,461

(22) Filed: Aug. 4, 2010

(65) Prior Publication Data

US 2011/0046948 A1 Feb. 24, 2011

Related U.S. Application Data

(60) Provisional application No. 61/236,380, filed on Aug. 24, 2009.

(30) Foreign Application Priority Data

Aug. 24, 2009 (EP) .................................... 09168480

(51) Int. Cl.
*G10L 15/00* (2006.01)
*G10L 15/06* (2006.01)
*G10L 15/20* (2006.01)

(52) U.S. Cl.
USPC ........... 704/231; 704/205; 704/225; 704/233; 381/73.1

(58) Field of Classification Search
USPC ................. 704/231, 236, 243, 251, 255, 258, 704/266, 275, 205, 225; 379/88.01, 88.03, 379/88.04; 380/275, 276; 381/73.1, 94.3
See application file for complete search history.

(56) References Cited

U.S. PATENT DOCUMENTS 3,636,261 A * 1/1972 Preston, Jr. ................... 704/231
4,087,630 A * 5/1978 Browning et al. ............ 704/236
4,827,519 A * 5/1989 Fujimoto et al. .............. 704/250
4,853,953 A * 8/1989 Fujisaki ..................... 379/88.03

(Continued)

FOREIGN PATENT DOCUMENTS

EP 2088802 A1 8/2009
JP 2000-152394 A 5/2000

OTHER PUBLICATIONS

Yoo et al., "Automatic Speech Recognition for the Hearing Impaired", IEEE Transactions on Consumer Electronics, vol. 54, No. 4, Nov. 2008, pp. 2029 to 2036.*

(Continued)

*Primary Examiner* — Martin Lerner
(74) *Attorney, Agent, or Firm* — Birch, Stewart, Kolasch & Birch, LLP

(57) ABSTRACT

The invention relates to a method of automatic sound recognition. The object of the present invention is to provide an alternative scheme for automatically recognizing sounds, e.g. human speech. The problem is solved by providing a training database comprising a number of models, each model representing a sound element in the form of a binary mask comprising binary time frequency (TF) units which indicate the energetic areas in time and frequency of the sound element in question, or of characteristic features or statistics extracted from the binary mask; providing an input signal comprising an input sound element; estimating the input sound element based on the models of the training database to provide an output sound element. The method has the advantage of being relatively simple and adaptable to the application in question. The invention may e.g. be used in devices comprising automatic sound recognition, e.g. for sound, e.g. voice control of a device, or in listening devices, e.g. hearing aids, for improving speech perception.

25 Claims, 5 Drawing Sheets

U.S. PATENT DOCUMENTS

| | | | | |
|---|---|---|---|---|
| 5,347,612 | A * | 9/1994 | Fujimoto et al. | 704/243 |
| 5,625,747 | A * | 4/1997 | Goldberg et al. | 704/243 |
| 5,706,398 | A * | 1/1998 | Assefa et al. | 704/249 |
| 6,157,727 | A * | 12/2000 | Rueda | 381/312 |
| 7,343,023 | B2 | 3/2008 | Nordqvist et al. | |
| 8,143,620 | B1 * | 3/2012 | Malinowski et al. | 257/56 |
| 8,204,263 | B2 * | 6/2012 | Pedersen et al. | 381/313 |
| 8,219,398 | B2 * | 7/2012 | Marple et al. | 704/260 |
| 2004/0039572 | A1 * | 2/2004 | Kiss et al. | 704/242 |
| 2008/0183471 | A1 | 7/2008 | Atal | |
| 2009/0012790 | A1 * | 1/2009 | Yamada et al. | 704/251 |
| 2009/0097670 | A1 * | 4/2009 | Jeong et al. | 381/73.1 |
| 2009/0202091 | A1 * | 8/2009 | Pedersen et al. | 381/313 |
| 2009/0238371 | A1 * | 9/2009 | Rumsey et al. | 381/58 |
| 2009/0276216 | A1 * | 11/2009 | Amini et al. | 704/236 |
| 2009/0304203 | A1 * | 12/2009 | Haykin et al. | 381/94.1 |
| 2011/0051948 | A1 * | 3/2011 | Boldt et al. | 381/73.1 |
| 2011/0058685 | A1 * | 3/2011 | Sagayama et al. | 381/98 |
| 2012/0148056 | A1 * | 6/2012 | Pedersen | 381/56 |

OTHER PUBLICATIONS

Brungart et al., "Isolating the energetic component of speech-on-speech masking with ideal time-frequency segregation", Journal of the Acoustical Society of America, vol. 120, No. 6, Jan. 1, 2006, pp. 4007-4018, XP012090861, ISSN: 0001-4966.

Li et al., "On the optimality of ideal binary time-frequency masks", Acoustics, Speech and Signal Processing, 2008. ICASSP 2008. IEEE International Conference on, IEEE, Piscataway, NJ, USA, Mar. 31, 2008, pp. 3501-3504, XP031251348, ISBN: 978-1-4244-1483-3.

Srinivasan et al., "A Schema-based model for phonemic restoration", Speech Communication 45 (2005), pp. 63-87 (chapter 3-4).

Srinivasan et al., "Binary and ratio time-frequency masks for robust speech recognition", Speech Communication 48 (2006), pp. 1486-1501.

* cited by examiner

AUTOMATIC SOUND RECOGNITION BASED ON BINARY TIME FREQUENCY UNITS

CROSS REFERENCE TO RELATED APPLICATIONS

This non provisional application claims the benefit of U.S. Provisional Application No. 61/236,380 filed on Aug. 24, 2009 and to Patent Application No. 09168480.3 filed in European Patent Office on Aug. 24, 2009. The entire contents of all of the above applications is hereby incorporated by reference.

TECHNICAL FIELD

The present invention relates to recognition of sounds. The invention relates specifically to a method of and a system for automatic sound recognition.

The invention furthermore relates to a data processing system and to a computer readable medium for, respectively, executing and storing software instructions implementing a method of automatic sound recognition, e.g. automatic speech recognition.

The invention may e.g. be useful in applications such as devices comprising automatic sound recognition, e.g. for sound, e.g. voice control of a device, or in listening devices, e.g. hearing aids, for improving speech perception.

BACKGROUND ART

Recognition of speech has been dealt with in a number of setups and for a number of different purposes using a variety of approaches and methods. The present application relates to the concept of time-frequency masking, which has been used to separate speech from noise in a mixed auditory environment. A review of this field and its potential for hearing aids is provided by [Wang, 2008].

US 2008/0183471 A1 describes a method of recognizing speech comprising providing a training database of a plurality of stored phonemes and transforming each phoneme into an orthogonal form based on singular value decomposition. A received audio speech signal is divided into individual phonemes and transformed into an orthogonal form based on singular value decomposition. The received transformed phonemes are compared to the stored transformed phonemes to determine which of the stored phonemes most closely correspond to the received phonemes.

[Srinivasan et al., 2005] describes a model for phonemic restoration. The input to the model is masked utterances with words containing masked phonemes, the maskers used being e.g. broadband sound sources. The masked phonemes are converted to a spectrogram and a binary mask of the spectrogram to identify reliable (i.e. the time-frequency unit containing predominantly speech energy) and unreliable (otherwise) parts is generated. The binary mask is used to partition the spectrogram into its clean and noisy parts. The recognition is based on word-level templates and Hidden Markov model (HMM) calculations.

DISCLOSURE OF INVENTION

It has recently been found that a binary mask estimated by comparing a clean speech signal to speech-shaped noise contains sufficient information concerning speech intelligibility.

In real world applications, only an estimate of a binary mask is available. However if the estimated mask is recognized as being a certain speech element, e.g. a word, or phoneme, the estimated mask (pattern) (e.g. gain or other representation of the energy of the speech element) can be modified in order to look even more like the pattern of the estimated speech element, e.g. a phoneme. Hereby speech intelligibility and speech quality may be increased.

A method or a sound recognition system, where the sound recognition training data are based on binary masks, i.e. binary time frequency units which indicate the energetic areas in time and frequency is described in the present application.

The term 'masking' is in the present context taken to mean 'weighting' or 'filtering', not to be confused with its meaning in the field of psychoacoustics ('blocking' or 'blinding').

It is known that the words of a language can be composed of a limited number of different sound elements, e.g. phonemes, e.g. 30-50 elements. Each sound element can e.g. be represented by a model (e.g. a statistical model) or template. The limited number of models necessary can be stored in a relatively small memory and therefore a speech recognition system according to the present invention renders itself to application in low power, small size, portable devices, e.g. communication devices, e.g. listening devices, such as hearing aids.

An object of the present invention is to provide an alternative scheme for automatically recognizing sounds, e.g. human speech.

A method:

An object of the invention is achieved by a method of automatic sound recognition. The method comprises

- providing a training database comprising a number of models, each model representing a sound element in the form of
  - a binary mask comprising binary time frequency (TF) units which indicate the energetic areas in time and frequency of the sound element in question, or of
  - characteristic features or statistics extracted from the binary mask;
- Providing an input signal comprising an input sound element;
- Estimating the input sound element based on the models of the training database to provide an output sound element.

The method has the advantage of being relatively simple and adaptable to the application in question.

The term 'estimating the input sound element' refers to the process of attempting to identify (recognize) the input sound element among a limited number of known sound elements. The term 'estimate' is intended to indicate the element of inaccuracy in the process due to the non-exact representation of the known sound elements (a known sound element can be represented in a number of ways, none of which can be said to be 'the only correct one'). If successful, the sound element is recognized.

In an embodiment, a set of training data representing a sound element is provided by converting a sound element to an electric input signal (e.g. using an input transducer, such as a microphone). In an embodiment, the (analogue) electric input signal is sampled (e.g. by an analogue to digital (AD) converter) with a sampling frequency $f_s$ to provide a digitized electric input signal comprising digital time samples $s_n$ of the input signal (amplitude) at consecutive points in time $t_n=n^*(1/f_s)$, n=1, 2, . . . . The duration in time of a sample is thus given by $T_s=1/f_s$.

Preferably, the input transducer comprises a microphone system comprising a number of microphones for separating acoustic sources in the environment.

In an embodiment, the digitized electric input signal is provided in a time-frequency representation, where a time representation of the signal exists for each of the frequency bands constituting the frequency range considered in the processing (from a minimum frequency $f_{min}$ to a maximum frequency $f_{max}$, e.g. from 10 Hz to 20 kHz, such as from 20 Hz to 12 kHz). Such representations can e.g. be implemented by a filter bank.

In an embodiment, a number of consecutive samples $s_n$ of the electric input signal are arranged in time frames $F_m$ (m=1, 2, . . . ), each time frame comprising a predefined number $N_{ds}$ of digital time samples $s_{nds}$ (nds=1, 2, . . . , $N_{ds}$) corresponding to a frame length in time of $L=N_{ds}/f_s=N_{ds}\cdot T_s$, each time sample comprising a digitized value $s_n$ (or s[n]) of the amplitude of the signal at a given sampling time $t_n$ (or n). Alternatively, the time frames $F_m$ may differ in length, e.g. according to a predefined scheme.

In an embodiment, successive time frames ($F_m$, $F_{m+1}$) have a predefined overlap of digital time samples. In general, the overlap may comprise any number of samples $\geqq 1$. In an embodiment, a quarter or half of the Q samples of a frame are identical from one frame $F_m$ to the next $F_{m+1}$.

In an embodiment, a frequency spectrum of the signal in each time frame (m) is provided. The frequency spectrum at a given time (m) is e.g. represented by a number of time-frequency units (p=1, 2, . . . , P) spanning the frequency range considered. A time-frequency unit TF(m,p) comprises a (generally complex) value of the signal in a particular time (m) and frequency (p) unit. In an embodiment, only the real part (magnitude, |TF(m,p)|) of the signal is considered, whereas the imaginary part (phase, Arg(TF(m,p))) is neglected. The time to time-frequency transformation may e.g. be performed by a Fourier Transformation algorithm, e.g. a Fast Fourier Transformation (FFT) algorithm.

In an embodiment, a DIR-unit of the microphone system is adapted to detect from which of the spatially different directions a particular time frequency region or TF-unit originates. This can be achieved in various different ways as e.g. described in U.S. Pat. No. 5,473,701 or in EP 1 005 783. EP 1 005 783 relates to estimating a direction-based time-frequency gain by comparing different beam former patterns. The time delay between two microphones can be used to determine a frequency weighting (filtering) of an audio signal. In an embodiment, the spatially different directions are adaptively determined, cf. e.g. U.S. Pat. No. 5,473,701 or EP 1 579 728 B1.

In a speech recognition system according to the invention, the binary training data (comprising models or templates of different speech elements) may be estimated by comparing a training set of (clean speech) units in time and frequency (TF-units, TF(f,t), f being frequency and t being time) from e.g. phonemes, words or whole sentences pronounced by different people (e.g. including different male and/or female), to speech shaped noise units similarly transformed into time-frequency units, cf. e.g. equation (2) below (or similarly to a fixed threshold in each frequency band, cf. e.g. equation (1) below; ideally the fixed threshold should be proportional to the long term energy estimate of the target speech signal in each frequency band). The basic speech elements (e.g. phonemes) are e.g. recorded as spoken by a number of different male and female persons (e.g. having different ages and/or fundamental frequencies). The multitude of versions of the same basic speech element are e.g. averaged or processed to extract characteristics of the speech element in question to provide a model or template for that speech element. The same is performed for other basic speech elements to provide a model or template for each of the basic speech elements. The training database may e.g. be organized to comprise vectors of binary masks (vs. frequency) resembling the binary masks to be recognized. The comparison should be done over a range of thresholds, where the thresholds range over the region yielding an all-zero binary mask to an all-one binary mask. An example of such a comparison is given by the following expression (fixed threshold) for the binary mask BM(f,t):

$$BM(f,t)=\begin{cases}1; & |TF(f,t)|^2 > LC+\tau(f)\\ 0; & \text{otherwise}\end{cases}, \tag{1}$$

where τ is a frequency dependent fixed threshold [dB], which may be made dependent on the input signal level, and LC is a local criterion, which can be varied across a range of e.g. 30 dB. TF(f,t) is a time-frequency representation of a particular speech element, f is frequency and t is time, $|TF(f,t)|^2$ thus representing energy content of the speech element measured in dB.

Alternatively, the time-frequency distribution can be compared to speech shaped noise SSN(f,t) having the same spectrum as the input signal TF(f,t). The comparison can e.g. be given by the following expression:

$$BM(f,t)=\begin{cases}1; & |TF(f,t)|^2 - |SSN(f,t)|^2 > LC\\ 0; & \text{otherwise}\end{cases}, \tag{2}$$

$|TF(f,t)|^2$ and $|SSN(f,t)|^2$ both denote the power distributions of the signals in the log domain. Given that the power of TF and SSN are equally strong, typical values of LC would be within [−20; +10] dB (cf. e.g. FIG. 3 in [Brungart et al., 2006]).

The comparison discussed above in the framework of training the database (i.e. the process of extracting the model binary masks of the sound elements in question from 'raw' training input data) may additionally be made in the sound recognition process proper. In the latter case, where a clean target signal is not available, an initial noise reduction process can advantageously be performed on the noisy target input signal, prior to the above described comparison over a range of thresholds (equation (1)) or with speech shaped noise (equation (2)).

Typically, the frequency (f) and time (t) indices are quantized, in the following p is used for frequency unit p (p=1, 2, 3, . . . ) and m is used for time unit m (m=1, 2, 3, . . . ).

In an embodiment, the threshold LC of the TF→BM calculation is dependent on the input signal level. In a loud environment people tend to raise their voice compared to a quiet environment (Lombard effect). Raised voice has a different long term spectrum than speech spoken with normal effort. In an embodiment, LC increases with increasing input level.

When recognizing an estimated binary time-frequency pattern, it is advantageous to remove non-informative TF units of the input signal. A way to remove non-informative, low-energy TF units is to force a TF unit to become zero, when the overall energy of that unit is below a certain threshold, e.g. so that TF(m,p)=0, IF $|TF(m,p)|^2<|X(m,p)|^2$, where m indicates a time index and p a frequency index, (m,p) thus defining a unique TF-unit. X(m,p) may e.g. be a speech-like noise signal or equal to a constant (e.g. real) threshold value LC, possibly plus a frequency dependent term τ (cf. e.g. equations (1), (2), above). In this way, low-energy units of the speech signal will be set equal to 0. This can be'performed directly on the received or recorded signal, or it can be performed as a post-processing after the estimation of a binary mask. In other words the estimated binary mask is AND'ed with the binary mask determined e.g. from the threshold value LC (possibly $+\tau$), so that non-informative, low-energy units are removed from the estimated mask.

When an estimated binary TF mask has been recognized as a certain phoneme, the estimated TF mask may be modified in a way so the pattern of the estimated phoneme becomes even closer to one of the patterns representing allowed phoneme patterns. One way to do so is simply to substitute the binary pattern with the pattern in the training database which is most similar to the estimated binary pattern. Hereby only binary patterns that exist in the training database will be allowed. This reconstructed TF mask may afterwards be converted to a time-frequency varying gain, which may be applied to a sound signal. The gain conversion can be linear or nonlinear. In an embodiment, a binary value of 1 is converted into a gain of 0 dB, while binary values equal to 0 are be converted into an attenuation of 20 dB. The amount of attenuation can e.g. be made dependent on the input level and the gain can be filtered across time or frequency in order to prevent too large changes in gain from one time-frequency unit to consecutive (neighboring) time-frequency units. Hereby speech intelligibility and/or sound quality may be increased.

In an embodiment, the binary time-frequency representation of a sound element is generated from a time-frequency representation of the sound element by an appropriate algorithm. In an embodiment, the algorithm considers only the magnitude $|TF(m,p)|$ of the complex value of the signal TF(m,p) in the given time-frequency unit (m,p). In an embodiment, an algorithm for generating a binary time-frequency mask is: IF ($|TF(m,p)| \geqq \tau$), BM(m,p)=1; otherwise BM(m,p)=0. In an embodiment, the threshold value $\tau$ equals 0 [dB]. The choice of the threshold can e.g. be in the range of [−15; 10 dB]. Outside this range the binary pattern will either be too dense (very few zeros) or too sparse (very few ones). Instead of a criterion on the magnitude $|TF(m,p)|$ of the signal, a criterion on the energy content $|TF(m,p)|^2$ of the signal can be used.

In an embodiment, a directional microphone system is used to provide an input signal to the sound recognition system. In an embodiment a binary mask ($BM_{ss}$) is estimated from another algorithm such that only a single sound source is presented by the mask, e.g. by using a microphone system comprising two closely spaced microphones to generate two cardoid directivity patterns $C_F(t,f)$ and $C_B(t,f)$ representing the time (t) and frequency (f) dependence of the energy of the input signal in the front (F) and back (B) cardoids, respectively, cf. e.g. [Boldt et al., 2008]. Non-informative units in the BM can then removed by multiplying $BM_{ss}$ by BM.

Automatic speech recognition based on binary masks can e.g. be implemented by Hidden Markov Model methods. A priori information can be build into the phoneme model. In that way the model can be made task dependent, e.g. language dependent, since the probability of a certain phoneme varies across different tasks or languages, see e.g. [Harper et al., 2008], cf. in particular p. 801. In an embodiment, characteristic features are extracted from the binary mask using a statistical model, e.g. Hidden Markov models.

In an embodiment, a code book of the binary (training) mask patterns corresponding to the most frequently expected sound elements is generated. In an embodiment, the code book is the training database. In an embodiment, the code book is used for estimating the input sound element. In an embodiment, the code book comprises a predefined number of binary mask patterns, e.g. adapted to the application in question (power consumption, memory size, etc.), e.g. less than 500 sound elements, such as less than 200 elements, such as less than 30 elements, such as less than 10 elements.

In an embodiment, pattern recognition in connection with the estimate of an input sound element relative to training data sets or models, e.g. provided in said code book or training database, is performed using a method suitable for providing a measure of the degree of similarity between two patterns or sequences that vary in time and rate, e.g. a statistical method, such as Hidden Markov Models (HMM) [Rabiner, 1989] or Dynamic Time Warping (DTW) [Sakoe et al., 1978].

In a particular embodiment, an action based on the identified output sound element(s) (e.g. speech element(s)) is taken. In a particular embodiment, the action comprises controlling a function of a device, e.g. the volume or a program shift of a hearing aid or a headset. Other examples of such actions involving controlling a function are battery status, program selection, control of the direction from which sounds should be amplified, accessory controls: e.g. relating to a cell phone, an audio selection device, a TV, etc. The present invention may e.g. be used to aid voice recognition in a listening device or alternatively or additionally for voice control of such or other devices.

In a particular embodiment, the method further comprises providing binary masks for the output sound elements by modifying the binary mask for each of the input sound elements according to the identified training sound elements and a predefined criterion. Such a criterion could e.g. be a distance measure which measures the similarity between the estimated mask and the training data.

In a particular embodiment, the method further comprises assembling (subsequent) output sound elements to an output signal.

In a particular embodiment, the method further comprises converting the binary masks for each of the output sound elements to corresponding gain patterns and applying the gain pattern to the input signal thereby providing an output signal. In other words a gain pattern $G(m,p)=BM(m,p)*G_{HA}(m,p)$ is provided, where BM(m,p) is the value of the (estimated) binary mask in a particular time (m) and frequency (p) unit, and $G_{HA}(m,p)$ represents a time and frequency dependent gain in the same time-frequency unit (e.g. as requested by a signal processing unit to compensate for a user's hearing impairment). '*' denotes the element-wise product of the two mxp-matrices (so that e.g. $g_{11}$ of G(m,p) equals $btf_{11}$ times $g_{HA,11}$ of BTF(m,p) and $G_{HA}(m,p)$, respectively). In general, the gain pattern G(m,p) is calculated as $G(m,p)=F[BM(m,p)]+G_{HA}(m,p)$ [dB], where F denotes a linear or non-linear function of BM(m,p) (F e.g. representing a binary to logarithmic transformation). An output signal OUT(m,p)=IN(m,p)+G(m,p) [dB] can thus be generated, where IN(m,p) is a time-frequency representation (TF(m,p)) of the input signal.

In a particular embodiment, the method further comprises presenting the output signal to a user, e.g. via a loudspeaker (or other output transducer).

In a particular embodiment, the sound element comprises a speech element. In an embodiment, the input signal to be analyzed by the automatic sound recognition system comprises speech or otherwise humanly uttered sounds comprising word elements (e.g. words or speech elements being sung). Alternatively, the sounds can be sounds uttered by an animal or characteristic sounds from the environment, e.g. from automotive devices or machines or any other characteristic sound that can be associated with a specific item or event. In such case the sets of training data are to be selected among the characteristic sounds in question. In an embodiment, the method of automatic sound recognition is focused on human speech to provide a method for automatic speech recognition (ASR).

In a particular embodiment, each speech element is a phoneme. In a particular embodiment, each sound element is a syllable. In a particular embodiment, each sound element is a word. In a particular embodiment, each sound element is a number of words forming a sentence or a part of a sentence. In an embodiment, the method may comprise speech elements selected among the group comprising a phoneme, a syllable, a word, a number of words forming a sentence or a part of a sentence, and combinations thereof.

A System:

An automatic sound recognition system is furthermore provided by the present invention. The system comprises

- a memory comprising a training database comprising a number of models, each model representing a sound element in the form of
  - a binary mask comprising binary time frequency (TF) units which indicate the energetic areas in time and frequency of the sound element in question, or of
  - characteristic features or statistics extracted from the binary mask;
- An input providing an input signal comprising an input sound element; and
- a processing unit adapted for estimating the input sound element based on input signal and the models of the training database stored in the memory to provide an output sound element.

In an embodiment, the system comprises an input transducer unit. In an embodiment, the input transducer unit comprises a directional microphone system for generating a directional input signal attempting to separate sound sources, e.g. to isolate one or more target sound sources.

It is intended that the process features of the method described above, in the detailed description of 'mode(s) for carrying out the invention' and in the claims can be combined with the system, when a process feature in question is appropriately substituted by a corresponding structural feature and vice versa. Embodiments of the system have the same advantages as the corresponding method.

Use of an ASR-System:

Use of an automatic sound recognition system as described above, in the section on 'mode(s) for carrying out the invention' or in the claims, is furthermore provided by the present invention. Use in a portable communication or listening device, such as a hearing instrument or a headset or a telephone, e.g. a mobile telephone, is provided. Use in a public address system, e.g. a classroom sound system is furthermore provided.

A Data Processing System:

A data processing system comprising a processor and program code means for causing the processor to perform at least some of the steps of the method described above, in the detailed description of 'mode(s) for carrying out the invention' and in the claims is furthermore provided by the present invention.

A Computer-Readable Medium:

A tangible computer-readable medium storing a computer program comprising program code means for causing a data processing system to perform at least some of the steps of the method described above, in the detailed description of 'mode (s) for carrying out the invention' and in the claims, when said computer program is executed on the data processing system is furthermore provided by the present invention. In addition to being stored on a tangible medium such as diskettes, CD-ROM-, DVD-, or hard disk media, or any other machine readable medium, the computer program can also be transmitted via a transmission medium such as a wired or wireless link or a network, e.g. the Internet, and loaded into a data processing system for being executed at a location different from that of the tangible medium.

Use of a Computer Program:

Use of a computer program comprising program code means for causing a data processing system to perform at least some of the steps of the method described above, in the detailed description of 'mode(s) for carrying out the invention' and in the claims, when said computer program is executed on the data processing system is furthermore provided by the present invention. Use of the computer program via a network, e.g. the Internet, is furthermore provided.

A Listening Device:

In a further aspect, a listening device comprising an automatic sound recognition system as described above, in the section on 'mode(s) for carrying out the invention' or in the claims, is furthermore provided by the present invention. In an embodiment, the listening device further comprises a unit (e.g. an input transducer, e.g. a microphone, or a transceiver for receiving a wired or wireless signal) for providing an electric input signal representing a sound element. In an embodiment, the listening device comprises an automatic speech recognition system. In an embodiment, the listening device further comprises an output transducer (e.g. one or more speakers for a hearing instrument of other audio device, electrodes for a cochlear implant or vibrators for a bone conduction device) for presenting an estimate of an input sound element to one or more user's of the system or a transceiver for transmitting a signal comprising an estimate of an input sound element to another device. In an embodiment, the listening device comprises a portable communication or listening device, such as a hearing instrument or a headset or a telephone, e.g. a mobile telephone, or a public address system, e.g. a classroom sound system.

In an embodiment, the automatic sound recognition system of the listening device is specifically adapted to a user's own voice. In an embodiment, the listening device comprises an own-voice detector, adapted to recognize the voice of the wearer of the listening device. In an embodiment, the system is adapted only to provide a control signal CTR to control a function of the system in case the own-voice detector has detected that the sound element in question forming basis for the control signal originates from the wearer's (user's) voice.

Further objects of the invention are achieved by the embodiments defined in the dependent claims and in the detailed description of the invention.

As used herein, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements maybe present, unless expressly stated otherwise. Furthermore, "connected" or "coupled" as used herein may include wirelessly connected or coupled. As used herein, the term "and/or" includes any and all combinations of one or more of the associated listed items. The steps of any method disclosed herein do not have to be performed in the exact order disclosed, unless expressly stated otherwise.

BRIEF DESCRIPTION OF DRAWINGS

The invention will be explained more fully below in connection with a preferred embodiment and with reference to the drawings in which.

The figures are schematic and simplified for clarity, and they just show details which are essential to the understanding of the invention, while other details are left out.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

MODE(S) FOR CARRYING OUT THE INVENTION

Figure 1:
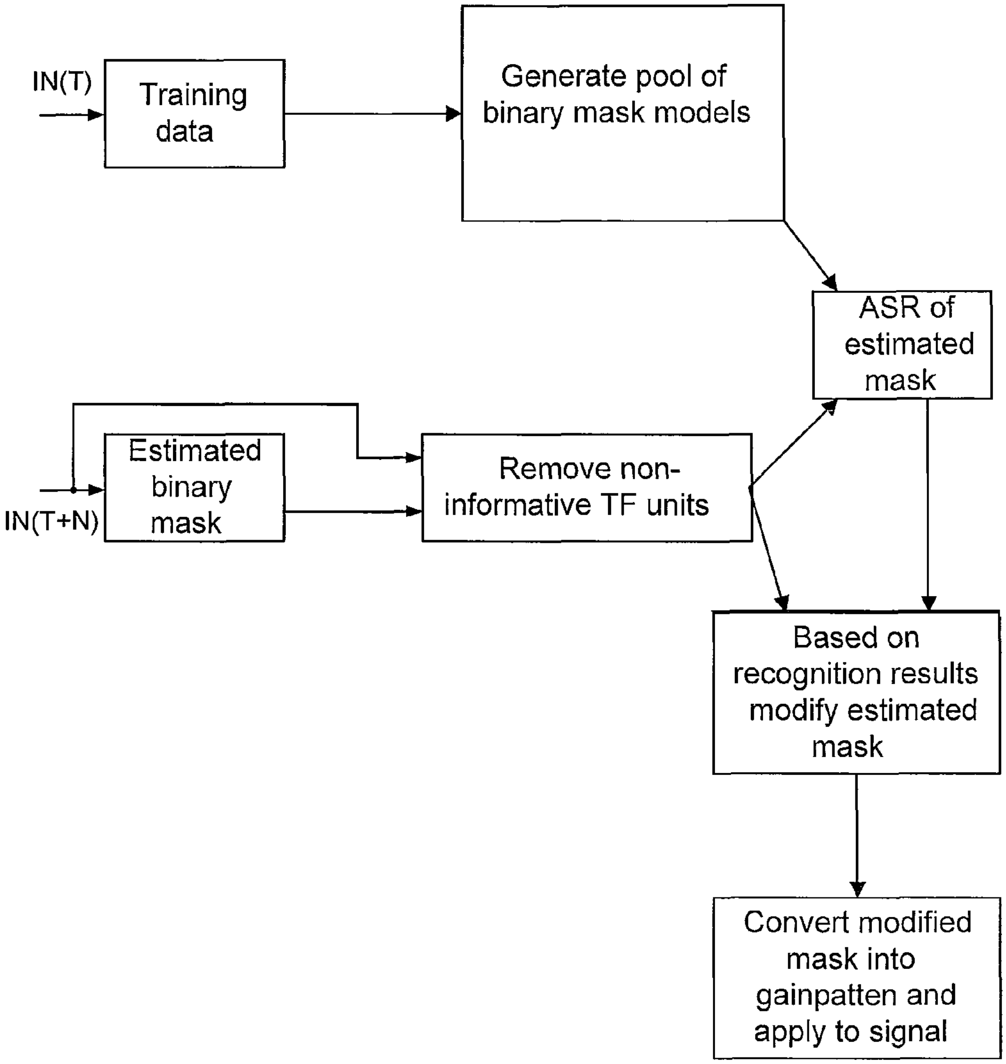
FIG. 1 shows elements of a first embodiment of a method of automatic sound recognition.

FIG. 1 shows elements of a first embodiment of a method of automatic sound recognition. The flow diagram of FIG. 1 illustrates the two paths or modes of the method, a first, Training data path comprising the generation of a data base of training data comprising models in the form of binary mask representations of a number of basic sound elements (block Generate pool of binary mask models) from a preferably noise-free target signal IN(T), and a second, input data path for providing noisy input sound elements in the form of input signal IN(T+N) (comprising target (T) and noise (N), T+N) for being recognized by comparison with the sound element models of the training database (the second, input data path comprising blocks Estimated binary mask and Remove non-informative TF units). The Training data are e.g. provided by recording the same sound element $SE_1$ (e.g. a phoneme or a word) provided by a number of different sources (e.g. different male and/or female adult and/or child persons) and then making a consolidated version comprising the common, most characteristic elements of the sound element in question. A number of different sound elements $SE_2, SE_3, \ldots, SE_Q$ are correspondingly recorded. Binary masks $BM_q(m,p)$, $q=1, 2, \ldots, Q$ representing the time (m)-frequency (p) distribution of energy of the different consolidated sound elements $SE_1, SE_2, \ldots, SE_Q$, are provided by an appropriate algorithm, thereby generating a training database comprising a pool of binary mask models (cf. block Generate pool of binary mask models). Alternatively, the training database may—for each sound element $SE_q$—comprise a number of different binary mask representations, instead of one consolidated representation. The input data IN(T+N) in the form of sound elements mixed with environmental sounds (T+N), e.g. noise from other voices, machines or natural phenomena, are recorded by a microphone system or alternatively received as a processed sound signal, e.g. from a noise reduction system, and an Estimated binary mask is provided from a time-frequency representation of the input sound element using an appropriate algorithm (e.g. comparing directional patterns to each other in order to extract sound sources from a single direction as described in [Boldt et al., 2008]). In an optional step, non-informative time-frequency units are set to zero according to an appropriate algorithm (e.g. removing low energetic units by comparing the input sound signal to speech shaped noise (cf. e.g. equation (2) above) or a fixed frequency dependent threshold and forcing all TF units below the threshold to 0, (block Remove non-informative TF units, cf. e.g. equation (2) above). The first and second paths of the method provides, respectively, a pool of binary mask model representations of basic sound elements (adapted to the application in question) and a series of binary mask representations of successive (e.g. noisy) input sound elements that are to be recognized by (a typically one-by-one) comparison with the pool of models of the training database (cf. block ASR of estimated mask). This comparison and the selection of the most appropriate representation of the input sound element among the stored models of the training database can e.g. be performed by a statistical method, e.g. using Hidden Markov Models, cf. e.g. [Young, 2008]. The arrow directly from block Remove non-informative TF units to block Based on recognition results modify estimated mask is intended to indicate instances where no match between the input binary mask and a binary mask model of the training database can be found. The binary mask of the input sound element can, after identification of the most appropriate binary mask model representation among the stored training database, e.g. be modified to provide a modified estimate of the input sound element (cf. block Based on recognition results, modify estimated mask). The modification can e.g. include entirely adapting the binary mask of the identified sound element as stored in the training database. Alternatively, isolated characteristic elements (characteristic TF-units) of the identified sound element can be transferred to the binary mask estimate of the input sound element, while other TF-units are left unchanged. Finally, the (possibly modified) binary mask estimate $BM_x(m,p)$ of the input sound element $SE_x$ can be converted to a gain pattern $G_x(m,p)$ and applied to the output signal (cf. block Convert modified mask into gainpattern and apply to signal), $OUT_x(m,p)=TF_x(m,p)*G_x(m,p)$ ("*" indicating element by element multiplication). In an embodiment, the identified binary mask estimate $BM_x(m,p)$ of the input sound element $SE_x$ is used to control a functional activity of a device (e.g. a selection of a particular activity or a change of a parameter).

Figure 2:
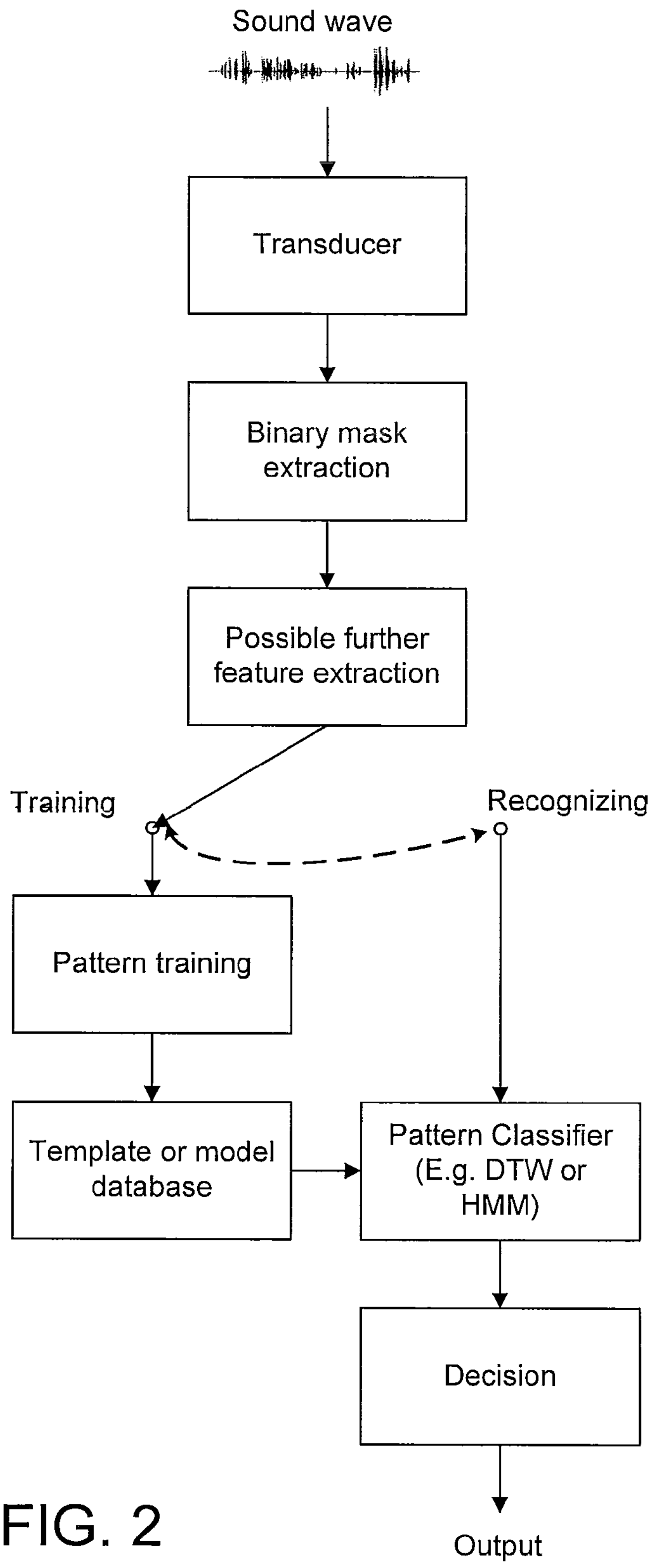
FIG. 2 shows elements of a second embodiment of a method of automatic sound recognition.
Figure 5A:
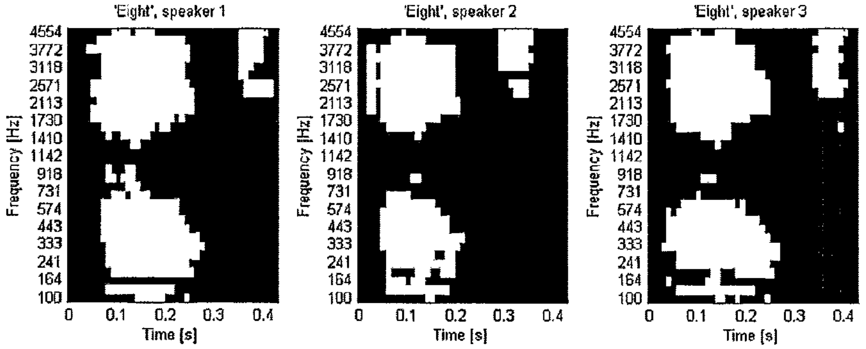
FIG. 5 shows exemplary binary masks of a particular sound element (here the word eight) spoken by three different persons, FIG. 5*a* illustrating the binary masks generated with a first algorithm threshold value $LC_1$, FIG. 5*b* illustrating the binary masks generated with a second algorithm threshold value $LC_2$.
Figure 5B:
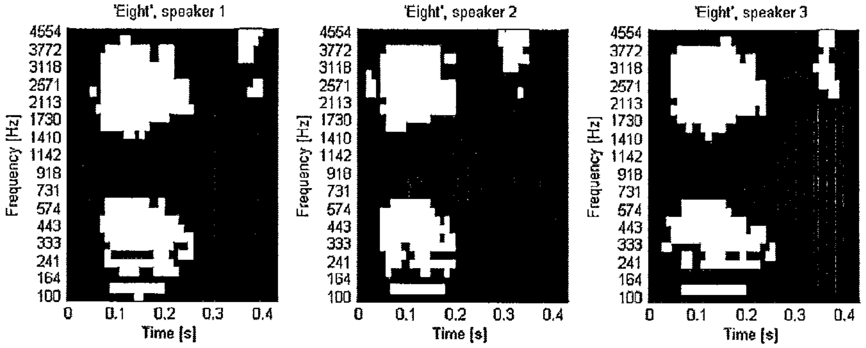

FIG. 2 illustrates basic elements of a method or system for automatic sound recognition. It comprises a Sound wave input, as indicated by the time-varying waveform symbol (either in the form of training data sound elements for being processed to sound element models or sound elements for being recognized (estimated)), which is picked up by a Transducer element. The Transducer element (e.g. a, possibly directional, microphone system) converts the Sound wave input signal to an electric input signal, which is fed to a Binary mask extraction block, where a binary mask of each sound element is generated from a time-frequency representation of the electric input signal according to an appropriate algorithm. The time-frequency representation of the electric input signal is e.g. generated by a Fast Fourier transformation (FFT) algorithm or a Short Time Fourier transformation (STFT) algorithm, which may e.g. be implemented in the Transducer block or in the Binary mask extraction block. The binary mask of a particular sound element is fed to an optional unit for extracting characteristics or features from the binary mask of a particular sound element (cf. block Possible further feature extraction). This can e.g. comprise a combination of multiple frequency bands to decide if the sound element is mainly voiced or unvoiced, or a measure of the density of the binary mask, i.e. the number of ones compared to the number of zeros. The embodiment of the method or system further comprises a Training path and a Recognizing path both—on selection—receiving their inputs from the Possible further feature extraction block (or alternatively, if such block is not present, from the Binary mask extraction block). In the 'training' mode shown in FIG. 2, the output of the Possible further feature extraction block is fed to the Training path (block Pattern training). In a normal 'operating mode', the output of the Possible further feature extraction block is fed to the Recognizing path (block Pattern Classifier (E.g. DTW or HMM)). The Training path comprises blocks Pattern training and Template or model database. The Pattern training block comprises the function of training the binary mask representations of the various sound elements (comprising e.g. the identification of the TF-units that are characteristic for the sound element $SE_q$ in question, irrespective of its source of origin). FIG. 5 shows exemplary binary masks of a particular sound element (here the word 'eight') spoken by three different persons (from left to right Speaker 1, Speaker 2, Speaker 3), FIG. 5*a* illustrating the binary masks generated with a first algorithm threshold value $LC_1$, FIG. 5*b* illustrating the binary masks generated with a second algorithm threshold value $LC_2$. The binary TF-masks represent a division of the frequency range from 0 to 5 kHz in 32 channels, the centre frequency (in Hz) of every second channel being indicated on the vertical frequency axis [Hz] (100, 164, 241, 333, . . . , 3118, 3772, 4554 [Hz]). The width of the channels increases with increasing frequency. The horizontal axis indicates time [s]. The time scale is divided into frames of 0.01 s, each sound element being shown in a time span from 0 to approximately 0.4 s. In the figures, a zero in a TF-unit is represented by a black element (indicating an in-significant energy content), whereas a one in a TF-unit is represented by a white element (indicating a significant energy content). A certain similarity between the three versions of the sound element is clear. The binary masks of FIG. 5*b* are the result of the use of a different algorithm threshold value $LC_2$ ($LC_2=LC_1+5$ dB), being manifested by a smaller number of ones in all three versions of the sound element of FIG. 5*b* compared to their respective counterparts in FIG. 5*a* (cf. e.g. equations (1) of (2) above). Such training can in practice e.g. be based on the use of Hidden Markov Model methods (cf. e.g. or [Rabiner, 1989] or [Young, 2008]). The block Template or model database comprises the storage of the sets of training data comprising the binary mask patterns representing the various sound elements $SE_1$, $SE_2$, . . . $SE_Q$ that are used for recognition. The Recognizing path comprises functional blocks Pattern Classifier (E.g. DTW or HMM) and Decision. The Pattern Classifier (E.g. DTW or HMM) block performs the task of recognizing (classifying) the binary mask of the input sound element using the Template or model database and e.g. a statistical model, e.g. Hidden Markov Model (HMM) or Dynamic Time Warping (DTW) methods. The result or estimate of the input sound element is fed to the Decision unit performing e.g. the task of selecting the most likely word/phoneme/sentence (or maybe the pattern is too unlikely to belong to any of these groups) and providing an Output. The output can e.g. be the recognized phoneme/word/sentence (or a representation thereof) or the most likely binary pattern. The output can e.g. be used as an input to further processing, e.g. to a sound control function.

FIG. 3 shows embodiments of a listening device comprising an automatic sound recognition system according to the invention.

Figure 3A:
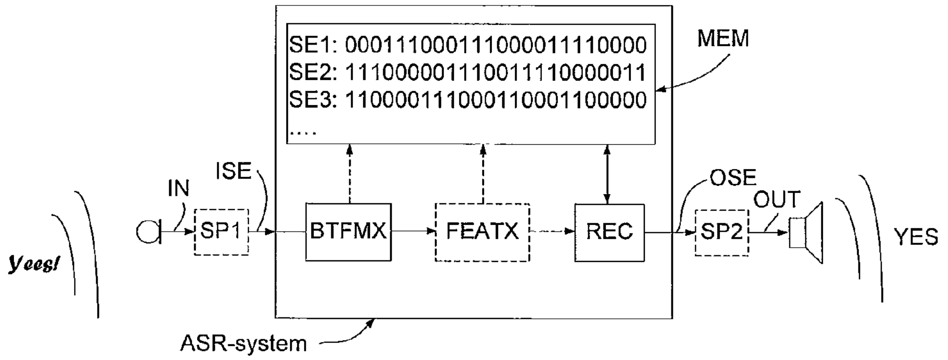
FIG. 3 shows embodiments of a listening device comprising an automatic sound recognition system according to the invention.

The embodiment of the listening device, e.g. a hearing instrument, in FIG. 3*a* comprises a microphone or microphone system for converting a sound input (here indicated by a sound element in the form of the word 'yes', indicated as *Yees!*) to an electric input signal IN, which is fed to an optional signal processing block (SP1), which e.g. performs the task of amplifying and/or digitizing the signal and/or providing a directional signal (e.g. isolating different acoustic sources) and/or converting the signal from a time domain representation to a time-frequency domain representation and providing as an output an electric input sound element ISE corresponding to the acoustic sound element. The electric input sound element ISE is fed to the automatic sound recognition system (ASR-system), e.g. in a time-frequency (TF) representation. The ASR-system comprises a binary time-frequency mask extraction unit (BTFMX) that converts the input time-frequency (TF) representation of the sound element in question to a binary time-frequency mask according to a predefined algorithm. The estimated binary mask (BM) of the input sound element is fed to an optional feature extraction block (FEATX) for extracting characteristic features (cf. block Possible further feature extraction in FIG. 2) of the estimated binary mask (BM) of the input sound element in question. The extracted features are fed to a recognizing block (REC) for performing the recognition of the binary mask (or features extracted there from) of the input sound element in question by comparison with the training database of binary mask model patterns (or features extracted there from) for a number of different sound elements expected to occur as input sound elements to be recognized. The training database of binary mask model patterns (MEM) is stored in a memory of the listening device (indicated in FIG. 3*a* by binary sequences 000111000 . . . for a number of different sound elements SE1, SE2, SE3, . . . in block MEM). The output of the recognizing block (REC) and the ASR-system is an output sound element OSE in the form of an estimate of the input sound element ISE. The pattern recognizing process can e.g. be performed using statistical methods, e.g. Hidden Markov models, cf. e.g. [Young, 2008]. The output sound element OSE is fed to optional further processing in processing unit block SP2 (e.g. for applying a frequency dependent gain according to a user's needs and/or other signal enhancement and/or performing a time-frequency to time transformation, and/or performing a digital to analogue transformation) whose output OUT is fed to an output transducer for converting an electric output signal to an output sound (here indicated as the estimated word element YES). The embodiment of FIG. 3*a* may alternatively form part of a public address system, e.g. a classroom sound system.

Figure 3B:
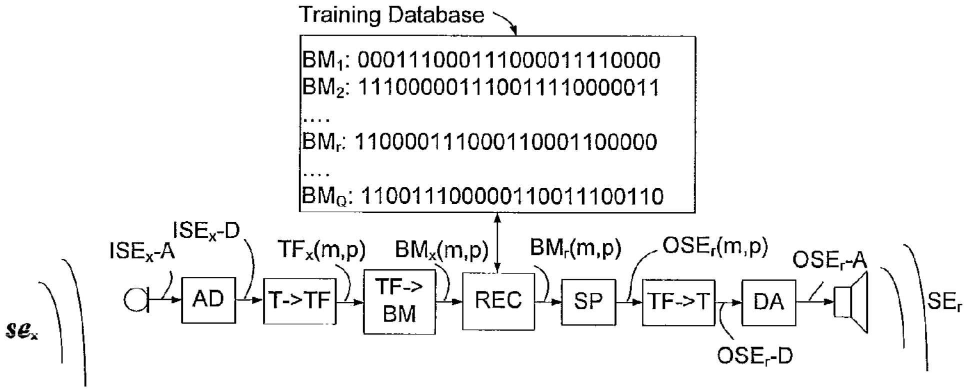

The embodiment of the listening device, e.g. a hearing instrument, shown in FIG. 3*b* is similar to that of FIG. 3*a*. The signal processing prior and subsequent to the automatic sound recognition is, however, more specific in FIG. 3*b*. A sound element, indicated as *$se_x$* is picked up by a microphone or microphone system for converting a sound input to an analogue electric input signal $ISE_x$-A, which is fed to an analogue to digital converter (AD) for providing a digitized version $ISE_x$-D of the input signal. The digitized version $ISE_x$-D of the input sound element is fed to a time to time-frequency conversion unit (T→TF) for converting the input signal from a time domain representation to a time-frequency domain representation and providing as an output a time-frequency mask $TF_x$(m,p), each unit (m,p) comprising a generally complex value of the input sound element at a particular unit (m,p) in time and frequency. Time-frequency mapping is e.g. described in [Vaidyanathan, 1993] and [Wang, 2008]. The time-frequency mask $TF_x$(m,p) is converted to a binary time-frequency representation BM(m,p) in unit TF→BM using a predefined algorithm (cf. e.g. EP 2 088 802 A1 and [Boldt et al.; 2008]). The estimated binary mask $BM_x$(m,p) of the input sound element is fed to a recognizing block (REC) for performing the recognition of the binary mask (or features extracted there from) of the input sound element in question by comparison with the training database of binary mask model patterns (or features extracted there from) for a number of different sound elements ($SE_1$, $SE_2$, . . . ) expected to occur as input sound elements to be recognized. In an embodiment, the sound element models of the training database are adapted in number and/or contents to the task of the application (e.g. to a particular sound (e.g. voice) control application, to a particular language, etc.). The process of matching the noisy binary mask to one of the binary mask models of the Training Database is e.g. governed by a statistical method, such as Hidden Markov Models (HMM) (cf. e.g. [Rabiner, 1989] or [Young, 2008]) or Dynamic Time Warping (DTW) (cf. e.g. [Sakoe et al., 1978]). The training database of binary mask model patterns (Training Database in FIG. 3*b*) is stored in a memory of the listening device (indicated in FIG. 3*b* by a number of binary sequences 000111000 . . . denoted $BM_1$, $BM_2$, . . . , $BM_r$, . . . , $BM_Q$ and representing binary mask models of the corresponding sound elements $SE_1$, $SE_2$, . . . , $SE_r$, . . . , $SE_Q$ in block Training Database). The output of the recognizing block (REC) is an output sound element in the form of an estimated binary mask element $BM_r$(m,p) of the input sound element $SE_x$. The estimated binary mask element $BM_r$(m,p) (representing output sound element $OSE_r$) is fed to an optional processing unit (SP), e.g. for applying a frequency dependent gain according to a user's needs and/or other signal enhancement. The output of the signal processing unit SP is output sound element $OSE_r$, which is fed to unit (TF→T) for performing a time-frequency to time transformation, providing a time dependent output signal $OSE_r$-D. The digital output signal $OSE_r$-D is fed to a DA unit for performing a digital to analogue transformation, whose output $OSE_r$-A is fed to an output transducer for converting an electric output signal to a signal representative of sound for a user (here indicated as the estimated sound element $SE_r$).

Figure 4A:
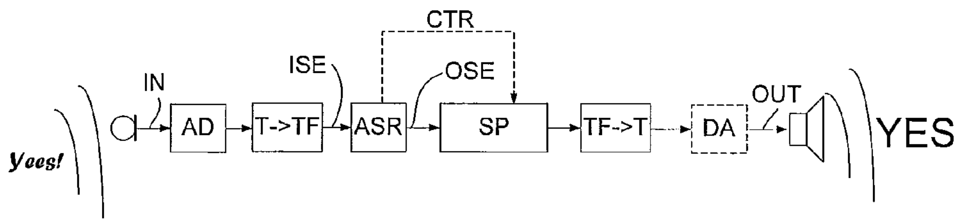
FIG. 4 shows various embodiments of listening devices comprising a speech recognition system according to an embodiment of the present invention.
Figure 4B:
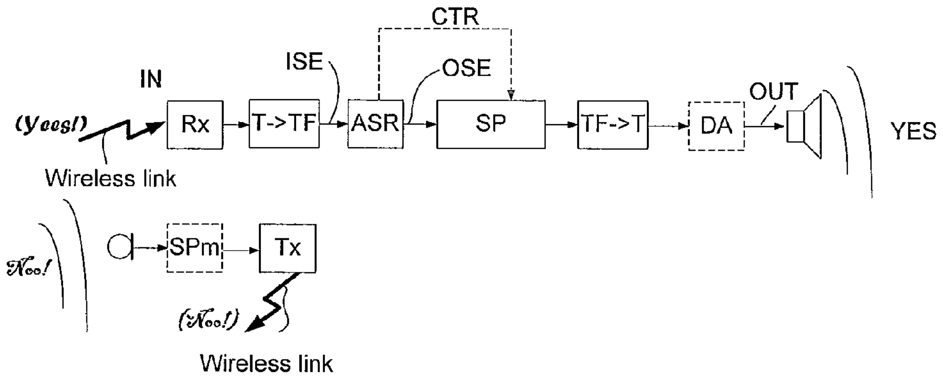
Figure 4C:
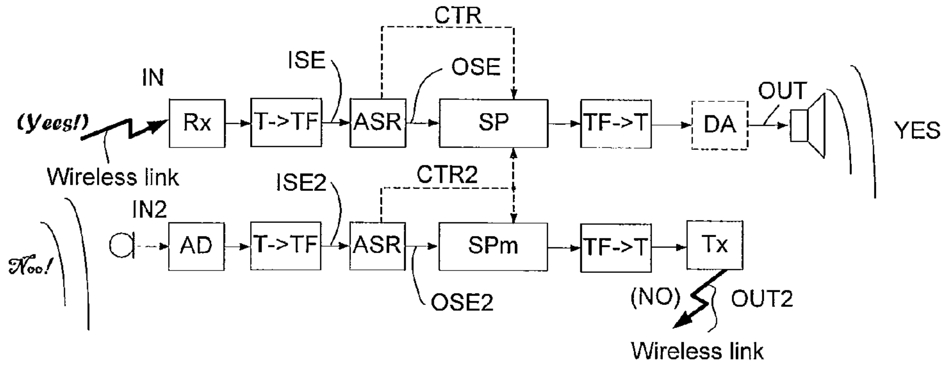

FIG. 4 shows various embodiments of a listening device comprising a speech recognition system according to an embodiment of the present invention. The embodiments shown in FIG. 4*a*, 4*b*, 4*c* all comprise a forward path from an input transducer (FIG. 4*a*) or transceiver (FIG. 4*b*, 4*c*) to an output transducer.

FIG. 4*a* illustrates an embodiment of a listening device, e.g. a hearing instrument, similar to that described above in connection with FIG. 3. The embodiment of FIG. 4*a* comprises the same functional elements as the embodiment of FIG. 3. The signal processing unit SP1 (or a part of it) of FIG. 3 is in FIG. 4*a* embodied in analogue to digital conversion unit AD for digitizing an analogue input IN from the microphone and time to time-frequency conversion unit T→TF for providing a time-frequency representation ISE of the digitized input signal IN. The time-frequency representation ISE of the input signal IN is (as in FIG. 3) fed to an automatic sound recognition system ASR as described in connection with FIG. 3. An output OSE of the ASR-system comprising a recognized sound element is fed to a signal processing unit SP. Further, a control signal CTR provided by the ASR-system on the basis of the recognized input sound element is fed to the signal processing unit SP for controlling a function or activity of the processing unit (e.g. changing a parameter setting, e.g. a volume setting or a program change). In an embodiment, the listening device comprises an own-voice detector, adapted to recognize the voice of the wearer of the listening device. In an embodiment, the system is adapted only to provide a control signal CTR in case the own-voice detector has detected that the sound element originates from the wearer's (user's) voice (to avoid other accidental voice inputs to influence the functionality of the listening device). The own-voice detector may e.g. be implemented as part of the ASR-system or in a functional unit independent of the ASR-system. An own-voice detector can be implemented in a number of different ways, e.g. as described in WO 2004/077090 A1 or in EP 1 956 589 A1. The signal processing unit SP is e.g. adapted to apply a frequency dependent gain according to a user's needs and/or other enhancement of the signal, e.g. noise suppression, feedback cancellation, etc. The processed output signal from the signal processing unit SP is fed to a TF→T unit for performing a time-frequency to time transformation, whose output is fed to a DA unit for performing a digital to analogue transformation of the signal. The signal processing unit SP2 (or a part of it) of the embodiment of FIG. 3, is in the embodiment of FIG. 4*a* embodied in units SP, TF→T and DA. The output OUT of the DA-unit is fed to an output transducer (here a speaker unit) for transforming the processed electrical output signal to an output sound, here in the form of the (amplified) estimate, YES, of the input sound element *Yees!* .

FIG. 4*b* illustrates an embodiment of a listening device, e.g. a communications device such as a headset or a telephone. The embodiment of FIG. 4*b* is similar to that described above in connection with FIG. 4*a*. The forward path of the embodiment of FIG. 4*b* comprises, however, receiver circuitry (Rx, here including an antenna) for electric (here wireless) reception and possibly demodulation of an input signal IN instead of the microphone (and AD-converter) of the embodiment of FIG. 4*a*. Apart from that, the forward path comprises the same functional units as that of the embodiment of FIG. 4*a*. In the embodiment of FIG. 4*b*, the signal processing unit SP may or may not be adapted to provide a frequency dependent gain according to a particular user's needs. In an embodiment, the signal processing unit is a standard audio processing unit whose functionality is not specifically adapted to a particular user's hearing impairment. Such an embodiment can e.g. be used in a telephone or headset application. In addition to the forward path receiving an electric input, wirelessly (as shown) or wired, the listening device comprises a microphone for picking up a person's voice (e.g. the wearer's own voice). In FIG. 4*b* the voice input is indicated by the sound *Noo!* The electric input signal from the microphone is fed to a signal processing unit SPm. The function of the signal processing unit SPm receiving the microphone signal is e.g. to perform the task of amplifying and/or digitizing the signal and/or providing a directional signal (e.g. isolating different acoustic sources) and/or converting the signal from a time domain representation to a time-frequency domain representation, and/or detecting a user's own voice, and providing an output to transceiver circuitry for transmitting the (possibly enhanced) microphone signal to another device (e.g. a PC or base station for a telephone) via a wireless (as shown here) or a wired connection. The (possibly modulated) voice output to the wireless link (comprising transmitter and antenna circuitry Tx and further indicated by the bold zig-zag arrow) is indicated by the reference (𝒩oo/).

FIG. 4*c* illustrates an embodiment of a listening device, e.g. a communications device such as a headset or a telephone or a public address system similar to that described above in connection with FIG. 4*b*. The microphone path additionally comprises an automatic sound recognition system ASR for recognizing an input sound element picked up by the microphone. The microphone path comprises the same functional elements (AD, T→TF, ASR, SP, TF→T) as described above for the forward path of the embodiment of FIG. 4*a*. The output of the time-frequency to time unit (TF→T) comprising an estimate of the input sound element IN2 𝒩oo/, is fed to transceiver and antenna circuitry (Tx) for transmitting the (possibly modulated) estimate OUT2 of the input sound signal IN2 (indicated by (NO)) to another device (as in the embodiment of FIG. 4*b*). The electric connection CTR2 between the ASR and the SP and SPm units of the forward and microphone paths, respectively, may e.g. be used to control functionality of the forward path and/or the microphone path (e.g. based on the identified sound element OSE2 comprising an estimate of a sound element ISE2 of the user's own voice). In such embodiment, the listening device may comprise an own-voice detector in the microphone path, adapted to recognize the voice of the wearer of the listening device.

In the embodiments of FIG. 4, the output transducer is shown as a speaker (receiver). Alternatively, the output transducer may be suitable for generating an appropriate output for a cochlear implant or a bone conduction device. Further, the listening device may in other embodiments comprise additional functional blocks in addition to those shown in FIG. 4*a*-4*c*. (e.g. inserted between any two of the blocks shown).

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims.

REFERENCES

[Wang, 2008] D. L. Wang, Time-Frequency Masking for Speech Separation and Its Potential for Hearing Aid design, Trends in Amplification, Vol. 12, 2008, pp. 332-353

US 2008/0183471 (AT&T) 31 Jul. 2008

[Srinivasan et al., 2005] S. Srinivasan, D. L. Wang, A schema-based model for phonemic restoration, Speech Communication, Vol. 45, 2005, pp. 63-87

[Harper et al., 2008] M. P. Harper and M. Maxwell, Spoken Language Characterization, Chapter 40 in Springer Handbook on Speech Processing, J. Benesty, M. M Sondhi, and Y. Huang (eds.), 2008, pp 797-809

U.S. Pat. No. 5,473,701 (AT&T) 5 Dec. 1995

EP 1 005 783 (PHONAK) 7 Jun. 2000

EP 1 579 728 B1 (OTICON) 8 Jul. 2004

[Boldt et al., 2008] J. B. Boldt, U. Kjems, M. S. Pedersen, T. Lunner, and D. L. Wang, Estimation of the ideal binary mask using directional systems. In Proceedings of the 11th International Workshop on Acoustic Echo and Noise Control, Seattle, Wash., September 2008

[Brungart et al., 2006] D. S. Brungart, P. S. Chang, B. D. Simpson, D. L. Wang, Isolating the energetic component of speech-on-speech masking with ideal time-frequency segregation, J. Acoust. Soc. Am. Vol. 120, No. 6, December 2006, pp. 4007-4018

[Rabiner, 1989] L. R. Rabiner, A Tutorial on Hidden Markov Models and Selected Applications in Speech Recognition, Proceedings of the IEEE, Vol. 77, No. 2, February 1989, pp. 257-286

[Sakoe et al., 1978] Hiroaki Sakoe and Seibi Chiba, Dynamic programming algorithm optimization for spoken word recognition, IEEE Trans. Acoust., Speech, Signal Processing, Vol. 26, pp. 43-49, February 1978

[Young, 2008] S. Young, HMMs and Related Speech Recognition Technologies, Chapter 27 in Springer Handbook on Speech Processing, J. Benesty, M. M Sondhi, and Y. Huang (eds.), 2008, pp. 539-557

EP 2 088 802 A1 (OTICON) 12 Aug. 2009

[Vaidyanathan, 1993] P. P. Vaidyanathan, Multirate Systems and Filter Banks, Prentice Hall Signal Processing Series, 1993.

WO 2004/077090 A1 (OTICON) 10 Sep. 2004

EP 1 956 589 A1 (OTICON) 13 Aug. 2008

The invention claimed is:

1. A method of automatic sound recognition, comprising:

providing a training database comprising a number of models, each model representing a sound element in the form of a binary mask comprising binary time frequency (TF) units which indicate energetic areas in time and frequency of the sound element in question, or of characteristic features or statistics extracted from the binary mask;

providing an input signal comprising an input sound element;

estimating with a processor the input sound element based on the models of the training database to provide an output sound element;

providing an input set of data representing the input sound element in the form of binary time frequency (TF) units which indicate the energetic areas in time and frequency of the sound element in question, or of characteristic features extracted from the binary mask; and providing binary masks for the output sound elements by modifying the binary mask for each of the corresponding input sound elements according to the identified training sound elements and a predefined criterion.

2. A method according to claim 1, further comprising:

estimating the input sound element by comparing the input set of data representing the input sound element with the number of models of the training database thereby identifying the most closely resembling training sound element according to a predefined criterion to provide an output sound element estimating the input sound element.

3. A method according to claim 1 comprising assembling output sound elements to an output signal.

4. A method according to claim 3 comprising presenting the output signal to a user.

5. A method according to claim 1, wherein an action based on the identified output sound element or elements comprises controlling a function of a device.

6. A method according to claim 1 wherein the sound element comprises a speech element.

7. A method according to claim 6 wherein a speech element is selected among the group comprising a phoneme, a syllable, a word, a number of words forming a sentence or a part of a sentence, and combinations thereof.

8. A method according to claim 1, wherein a codebook of the binary mask patterns corresponding to the most frequently expected sound elements is generated and used for estimating the input sound element, the codebook comprising less than 50 elements.

9. A data processing system comprising a processor and program code means for causing the processor to perform the steps of the method of claim 1.

10. A tangible computer-readable medium storing a computer program comprising program code means for causing a data processing system to perform the steps of the method of claim 1, when said computer program is executed on the data processing system.

11. A method of automatic sound recognition, comprising:

providing a training database comprising a number of models, each model representing a sound element in the form of a binary mask comprising binary time frequency (TF) units which indicate energetic areas in time and frequency of the sound element in question, or of characteristic features or statistics extracted from the binary mask;

providing an input signal comprising an input sound element;

estimating with a processor the input sound element based on the models of the training database to provide an output sound element;

providing binary masks for the output sound elements;

converting the binary masks for each of the output sound elements to corresponding gain patterns; and applying the gain pattern to the input signal thereby providing an output signal.

12. An automatic sound recognition system, comprising:

a memory storing a training database comprising a number of models, each model representing a sound element in the form of a binary mask comprising binary time frequency (TF) units which indicate energetic areas in time and frequency of the sound element in question, or of characteristic features or statistics extracted from the binary mask;

an input providing an input signal comprising an input sound element; and a processing unit configured to estimate the input sound element based on input signal and the models of the training database stored in the memory to provide an output sound element, to provide an input set of data representing the input sound element in the form of binary time frequency (TF) units which indicate the energetic areas in time and frequency of the sound element in question, or of characteristic features extracted from the binary mask, and to provide binary masks for the output sound elements by modifying the binary mask for each of the corresponding input sound elements according to the identified training sound elements and a predefined criterion.

13. An automatic sound recognition system, comprising:

a memory storing a training database comprising a number of models, each model representing a sound element in the form of a binary mask comprising binary time frequency (TF) units which indicate energetic areas in time and frequency of the sound element in question, or of characteristic features or statistics extracted from the binary mask;

an input providing an input signal comprising an input sound element; and a processing unit configured to estimate the input sound element based on input signal and the models of the training database stored in the memory to provide an output sound element, to provide binary masks for the output sound elements, to convert the binary masks for each of the output sound elements to corresponding gain patterns, and to apply the gain pattern to the input signal thereby providing an output signal.

14. A listening device, comprising:

a memory storing a training database comprising a number of models, each model representing a sound element in the form of a binary mask comprising binary time frequency (TF) units which indicate energetic areas in time and frequency of the sound element in question, or of characteristic features or statistics extracted from the binary mask;

an input interface providing an input signal comprising an input sound element; and a processing unit configured to estimate the input sound element based on the input signal and the models of the training database stored in the memory to provide an output sound element, to provide an input set of data representing the input sound element in the form of binary time frequency (TF) units which indicate the energetic areas in time and frequency of the sound element in question, or of characteristic features extracted from the binary mask, and to provide binary masks for the output sound elements by modifying the binary mask for each of the corresponding input sound elements according to the identified training sound elements and a predefined criterion.

15. The listening device according to claim 14, further comprising:

a wireless transceiver operatively coupled to said input interface, wherein the input signal is received wirelessly by the wireless transceiver.

16. The listening device according to claim 14, further comprising:

a microphone operatively coupled to said input interface, wherein the microphone receives an acoustic signal and provides the input signal to the input interface.

17. The listening device according to claim 14, further comprising:

a transceiver configured to transmit the output sound element estimated by the processing unit to an external device.

18. The listening device according to claim 14, wherein the processing unit is further configured to voice control the listening device based on the output sound elements.

19. The listening device according to claim 14, wherein the listening device is one of a hearing instrument, a headset, and a telephone.

20. A listening device, comprising:

a memory storing a training database comprising a number of models, each model representing a sound element in the form of a binary mask comprising binary time frequency (TF) units which indicate energetic areas in time and frequency of the sound element in question, or of characteristic features or statistics extracted from the binary mask;

an input interface providing an input signal comprising an input sound element; and a processing unit configured to estimate the input sound element based on the input signal and the models of the training database stored in the memory to provide an output sound element, to provide binary masks for the output sound elements, to convert the binary masks for each of the output sound elements to corresponding gain patterns, and to apply the gain pattern to the input signal thereby providing an output signal.

21. The listening device according to claim 20, further comprising:

a wireless transceiver operatively coupled to said input interface, wherein the input signal is received wirelessly by the wireless transceiver.

22. The listening device according to claim 20, further comprising:

a microphone operatively coupled to said input interface, wherein the microphone receives an acoustic signal and provides the input signal to the input interface.

23. The listening device according to claim 20, further comprising:

a transceiver configured to transmit the output sound element estimated by the processing unit to an external device.

24. The listening device according to claim 20, wherein the processing unit is further configured to voice control the listening device based on the output sound elements.

25. The listening device according to claim 20, wherein the listening device is one of a hearing instrument, a headset, and a telephone.

* * * * *